April 20, 1954 L. DOBSON 2,675,682
TANK FOR TRANSPORTING LIQUID ETHYLENE
Filed Jan. 24, 1952
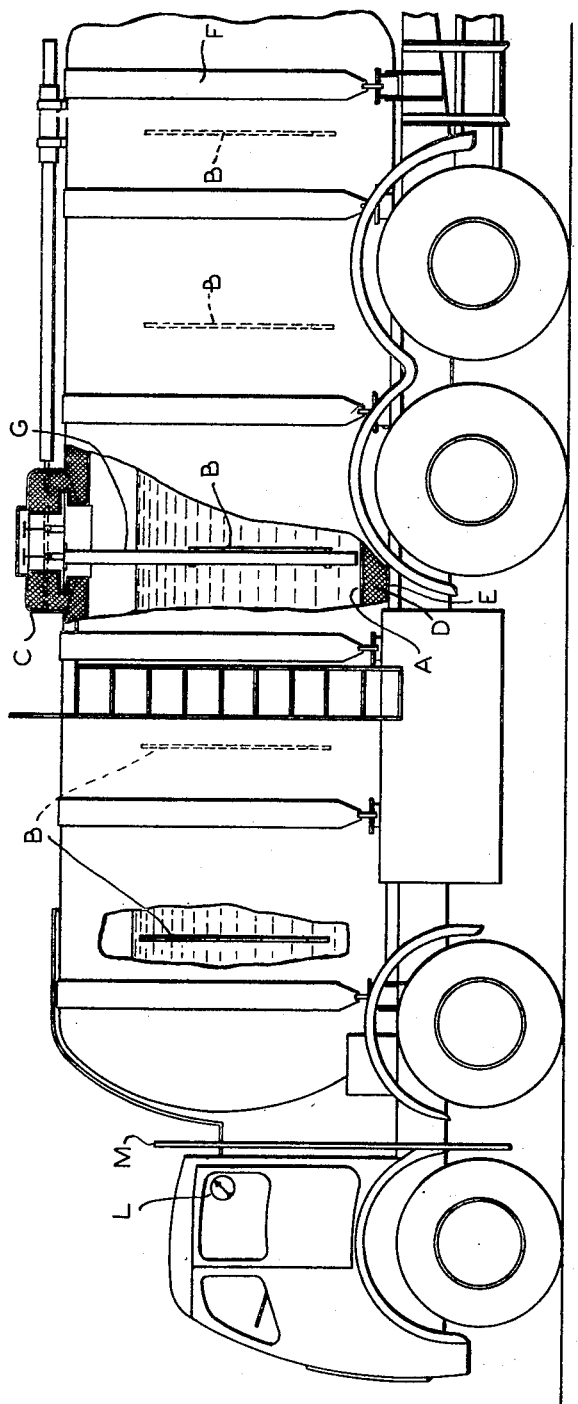
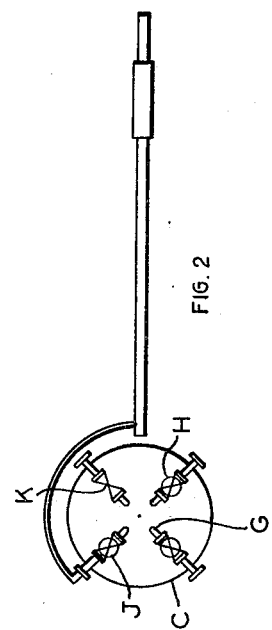
INVENTOR
LESLIE DOBSON
Cushman, Darby & Cushman
ATTORNEYS Patented Apr. 20, 1954

2,675,682

UNITED STATES PATENT OFFICE 2,675,682

TANK FOR TRANSPORTING LIQUID ETHYLENE

Leslie Dobson, Northwich, England, assignor to Imperial Chemical Industries Limited, a corporation of Great Britain Application January 24, 1952, Serial No. 268,013

Claims priority, application Great Britain January 9, 1952

5 Claims. (Cl. 62—1)

This invention relates to a new method for the transport of liquid ethylene.

Hitherto ethylene has only been transported in the usual type of high pressure gas cylinder of 1–2 cubic feet capacity, designed to withstand a pressure of 100–150 atmospheres. The ethylene in such cylinders will be liquid when the temperature is below 9° C., but conveyance of such cylinders involves the transport of many tons of cylinder and wagon for every ton of ethylene and is therefore uneconomic compared with methods of bulk transport in use for other liquids. It is widely believed that liquid ethylene is a hazardous substance. It exists at atmospheric pressure only at temperatures below −100° C., and when allowed to warm up in an enclosed space it generates a pressure rising to 50 atmospheres at 9° C., above which it is entirely a gas. It is highly inflammable, and a liquid ethylene fire cannot be extinguished by normal methods because the liquid boils when cold water is poured on it and thus the conflagration is intensified.

The difficulties are so great that conversion to ethyl alcohol and subsequent dehydration to ethylene is practised, and even manufacture of solid ethylene hydrate and transport as solid in closed vehicles has been considered.

My invention comprises the transport of ethylene as a liquid in bulk, in conditions such that a road tanker can readily carry half its weight of ethylene and thus achieve an economic payload. Most liquids which have hitherto been transported in bulk are readily handled under normal temperature and pressure conditions; others which involve abnormal temperature or pressure conditions do not involve in combination abnormally low temperatures, high pressures, and intense fire hazards. Gases which have been transported in the liquefied state are mostly harmless and in any case normally occur in the atmosphere and so are suitable for discharging into it. Inflammable materials have only been transported at atmospheric temperature, and the conditions used, if used for ethylene, would only permit about 0.62 lb. of ethylene being carried per cubic foot of container.

My method briefly involves loading liquid ethylene at or near atmospheric pressure into a specially constructed thermally insulated pressure-resistant container, sealing the container, and transporting the filled container. The construction involves materials of suitable mechanical strength at −100° C. We make our containers of chromium nickel austenitic stainless steel, or of plain nickel steel. The former generally contains 17–20% chromium, 7–12% nickel, and a small proportion of titanium and niobium. The nickel steels generally contain either 3–5% nickel or 8–9% nickel. We have shown that carefully made welds using welding rods of similar materials can withstand sufficient impact even at −100° C. to withstand shocks normally encountered in transit, and sufficient tensile strength at −50° C. to withstand the pressure generated by liquid ethylene at this temperature, and therefore containers may be welded from rolled plate and spun dished endplates. The thickness of the plates is governed by the pressure generated during transit. One factor on which this pressure depends is the thermal insulation. The insulation I employ is such that the amount of heat transferred into the vessel under normal atmospheric temperature and during a transportation period of several days is insufficient to raise the pressure developed by the liquid ethylene up to the safe working limit of the container.

It would be possible to use very thick-walled containers capable of withstanding 50 or more atmospheres pressure. It would also be possible to use very thick thermal insulation such that no material rise of temperature of the liquid ethylene occurred during transport. However, thick-walled containers of perhaps an inch or so thickness involve so much weight that it would then be impracticable to have an economic payload. Thick thermal insulation such as the 3 feet normally used for liquid ethylene in chemical plant would occupy so much space in the limits permissible for road tankers that there would be virtually no space left for the liquid ethylene to occupy. We have therefore had to discover a sound method of transport overcoming all the hazards, ascertain what materials may be used, and design the best thickness of wall and thermal insulation. We find that the optimum conditions are to allow for 5 days transit and ensure that during this period the heat absorbed does not raise the internal pressure above 20 atmospheres. With 20 atmospheres as the safe working pressure, however, it is desirable to arrange that the pressure does not exceed 15 atmospheres and preferably does not exceed 10 atmospheres. In practice, with road journeys of only 1–3 days, or in winter, it will often not exceed 5 or 7 atmospheres. The container is equipped with means for venting it to atmosphere at a pressure not exceeding 20 atmospheres, normally in the region of 10 or 15 atmospheres.

Such conditions are provided by having the walls of the container between ⅜ inch and ½ inch thickness, and carefully inspecting the welds of the container for soundness by radiographic means and carrying out mechanical tests on coupon plates which are welded under precisely the same conditions as the vessel itself. This container is entirely surrounded with thermal insulation which does not absorb water vapour from the atmosphere, the preferred type being an expanded ebonite of which a very large proportion of the volume is occupied by disconnected bubbles. This insulation should be between 2 and 8 inches in thickness, preferably between 4 and 6 inches. In order to protect the insulation and make even more certain that water does not freeze into it from the atmosphere during use, the insulation is surrounded with an aluminium or similar cover of light weight and low absorptivity for heat. With an airtight cover, cork or sponge rubber may also be used. For journeys of 5–8 days duration, 8 inches thickness of insulation combined with container walls ⅜ inch in thickness has the same as 3 inches thickness of insulation with container walls one inch in thickness; the former only allows a small increase of pressure during transit, and the latter withstands the larger increase of pressure which occurs during transit.

Transit for several days is adequately dealt with by the above method, but after 7–10 days or in hot weather after 5 days or even after 3 days in intense conditions the pressure may rise above the desired limit. My invention therefore includes means for the release of pressure when it rises above the aforesaid limits, by venting the inside of the container to atmosphere. We have found that the pressure in the container rises unexpectedly fast when the container is standing still. This disturbing phenomenon is due to absorption of heat through the walls causing a much greater rise of temperature in the gas phase at the top of the container than in the liquid phase, because of the lower specific heat per unit volume of the gas. A rise in pressure is thus set up, which we overcome by setting the vehicle in motion. It is this motion of the vehicle which enables us to avoid the high pressure rise and unstable state, and this distinguishes our insulation conditions from those normally regarded as necessary for storage of liquid ethylene. Nevertheless, a safety valve and a hand-operated vent valve are provided for use if necessary in journeys in excess of 5 days or in the event of transport breakdown.

In a pressure vessel for transporting gaseous ethylene at atmospheric temperature, if a pressure of 1500 lb. per square inch is used in a vessel stressed to 10,000 lb. per square inch and made of a light aluminium alloy, the ethylene gas density is only 16 lb. per cubic foot and the container alone, ignoring the chassis to carry it, weighs three times as much as the ethylene it contains. By using my invention, I can readily carry 7 tons of ethylene in a road tanker which, complete with the whole chassis and container, only weighs 13 tons.

The container must not be wholly filled with liquid ethylene but may be filled to about 85% capacity at −100° C. As it gradually warms up during transit the liquid expands more than the container and therefore, if the container is already wholly filled with liquor, there is an alarming rise of pressure and the safety valve blows.

Ethylene can be liquefied by compressing it to about 700 lb./sq. in., cooling to about 25° C., and throttling to atmospheric pressure. The density of the boiling liquid at atmospheric pressure is 35 lb./ft.$^3$. To allow for some expansion we may assume 32 lb./ft.$^3$ for calculating the volume required. For a total loaded weight of 20 tons we assume 20,000 lb. of ethylene, occupying 625 ft.$^3$, say in a cylinder 25 ft. long by 5.6 ft. dia., giving a surface area of 500 ft.$^2$. Any particular value for the wall thickness of the metal cylinder will give a corresponding maximum pressure, and the temperature of the boiling point corresponding to this pressure will fix the amount of heat that may be allowed to enter the tank in for example 24 hours, and will therefore give the thickness of lagging required. A metal thickness of ⅜ in., stressed to 10,000 lb./sq. in., will give a maximum working pressure of 100 lb./sq. in. gauge, corresponding to a boiling point of −82° F. The change of total heat of the liquid in warming from the atmospheric boiling point, −155° F., to −82° F. is 45 B. t. u. per lb., i. e. 900,000 B. t. u. in all. Assuming an air temperature of 100° F., the mean temperature difference across the lagging will be 218° F. Taking the conductivity of the lagging as 0.017 B. t. u./hr. ft.$^2$ °F./ft., the required thickness of lagging can be calculated using the following formula:

$$\frac{n(\Delta t)(Hc)(A)(24)}{\Delta H}$$

wherein $n$ equals number of days of transit up to 10, $\Delta t$ equals mean temperature differences in °F. across the insulation, $A$ equals the surface area of the container in ft.$^2$, $Hc$ equals the conductivity of the insulation in B. t. u./hr. ft.$^2$ °F./ft. and $\Delta H$ equals the maximum permissible heat absorption in B. t. u. Thus, by inserting the data given above in the foregoing formula, the desired lagging thickness is:

$$\frac{218 \times 500 \times 0.017 \times 24}{900,000} \text{ ft.} \quad \overset{°F.}{} \overset{ft.^2}{} \overset{hr.}{}$$

$$=0.05 \text{ ft.}$$
$$=0.6 \text{ inch}$$

If transport takes 10 days in extreme cases, then a thickness of 6 inches of lagging would be required. Alternatively, we could choose steel of only ⅛ inch thickness. In this case the pressure would be 33 lb./sq. in. gauge, boiling point would be −112° F., change in total heat of 24 B. t. u./lb., giving a lagging thickness of $$\frac{233 \times 500 \times 0.017 \times 24 \times 12}{24 \times 20,000} \text{ inches}$$

$$=1.2 \text{ inches per day of transit}$$

As another example, we will consider a large rail tank wagon containing 60,000 lb. of ethylene, and required to remain below the blow-off pressure for 10 days. By the same method as above, we obtain the following values:

Diameter of cylinder _____ 8.1 ft.
Surface area _____ 1050 sq. ft.
Thickness, say _____ ¼ inch.
Corresponding pressure _____ 51 lb./sq. in. gauge.
Corresponding temperature ___ −100° F.
Mean temperature difference __ 227° F.
Permissible heat input _____ 33 B. t. u./lb.

giving a thickness of $$\frac{227 \times 1050 \times 0.017 \times 240 \times 12}{33 \times 60,000} \text{ inches}$$

$$=5.9 \text{ inches}$$

This is a reasonable thickness of lagging, although if the size rather than the total weight of the container is limited a greater thickness of metal, correspondingly less insulation, and therefore a larger tank, might be more economical.

A comparison with operation at atmospheric temperature for the same quantity of ethylene is made in the following table.

|  | Stainless Steel Insulated Vessel | Duralumin Vessel at atmospheric temperature |
|---|---|---|
| Wt. of ethylene........................lb.. | 60,000 | 60,000 |
| Volume of ethylene..................ft.³.. | 1,950 | 3,750 |
| Volume of metal......................ft.³.. | 22 | 1,070 |
| Volume of lagging...................ft.³.. | 560 |  |
| Total volume of metal and lagging..ft.³.. | 582 | 1,070 |
| Wt. of metal..........................lb.. | 11,000 | 180,000 |
| Wt. of lagging........................lb.. | 2,240 |  |
| Total wt. of metal and lagging........lb.. | 13,240 | 180,000 |

The above calculations assume that the container is completely surrounded by insulation, and any considerable direct metal-to-metal contact between the container and its supporting frame would cause a serious loss of insulation. To avoid this effect, bearers of a material combining low thermal conductivity with some strength in compression should be placed between the container and its supports in the place of the normal insulation.

An opening from near the bottom of the container is required for emptying, and another near the top to admit compressed ethylene during unloading. Since any exposed valves are liable to become coated with frost, and possibly jammed, the two valves referred to above and the safety valve are grouped together and submerged in a bath of methanol under an insulated dome at the top of the container. In the case of long journeys, where the required thickness of insulation becomes excessive, it may be convenient to fit a refrigerating plant to balance the heat gained through the insulation.

The construction of a road tanker for use in this invention is shown in Figure 1. Figure 2 shows the valve equipment of the container viewed from above. The insulated container is mounted on a standard type of 8-wheel or similar chassis. A represents a drum made up of 18/8/1 chromium-nickel-niobium steel sheets by rolling and welding them together and welding on spun endplates of the same material. The welding rods used were of 25/12 chromium nickel steel, and all welds were inspected for soundness by radiographic methods. The drum is approximately 26 feet long and 5 feet 9 inches internal diameter, and the sheets used in its construction are $\frac{7}{16}$ inch thick. The spun endplates are ½ inch thick. Inside the drum are five baffle plates, B, extending from side to side and having a connecting space underneath and staggered connecting holes, for the purpose of preventing surging of the liquid during movement of the road tanker. This drum is completely enclosed, save for the header C, with a lagging D consisting of soft expanded ebonite containing a high proportion of unconnected bubbles so as to give it a spongy effect but yet have very little absorptive capacity for water. Such a material is sold under the trade name "Onazote." The lagging is 5 inches thick, and is surrounded by a metallic cover E made of aluminium alloy and which is intended to protect the lagging from damage and from water, and which has a high polish so as to reduce radiation. Around this cover are five holding ties F which fasten the whole on to the chassis. In order to take the weight and the strain, the lagging in the region of the ties, at least in the lower half thereof, is reinforced with a heavier grade of "Onazote." There are four connections to the tanker. One is the dip pipe G and valve, for filling and emptying the liquid ethylene. The second is pipe H for releasing ethylene gas during filling or for blowing in gaseous ethylene under sufficient pressure to blow the liquid out. The third is the safety valve K, and the fourth is the hand vent J, both K and J releasing to the atmosphere when necessary through a flame trap. All these four are grouped together under the header cap C in order to avoid them frosting up. There is also a pressure indicator L in the driver's cab to show the pressure inside the container, and a firescreen M between the container and the driver.

During filling, liquid ethylene is run into the tanker at about −100° C. and about atmospheric pressure, and the tanker is weighed to determine its contents. It is important to leave approximately 15% of the volume free of liquid, in order to allow for the greater coefficient of expansion of the liquid than of the container. The level of liquid can also be tested by means of a float, provided a suitable type of float is used. The density of liquid ethylene is approximately 0.5 gram per cc., and before discharging the ethylene the pressure may well reach 3 or even 10 atmospheres, so the usual type of ball float is either too heavy to float or too weak to avoid collapse under the pressure. We therefore use a ball float made of "Onazote" and covered with an impervious layer.

During transit, the pressure in the container slowly rises, but even during 3 to 5 days summer travel it does not normally exceed 3 atmospheres. If it does, it may be desirable to blow off a little ethylene gas when clear of all fire risk. On standing in the sunshine, the pressure may rise surprisingly fast compared with the temperature of the liquid, because the gas space at the top of the tank gets hotter than the liquid. This may be overcome by taking the tanker for a short ride, or in extreme cases by blowing off a very little ethylene gas.

For unloading, ethylene gas under pressure is blown into the container through the valve H and liquid ethylene comes out through the dip pipe G by opening the valve thereon. It is important when discharging the liquid ethylene from the container to ensure that not more than 2 or 3 cwts. of liquid ethylene remain in it. With slightly more than this quantity of liquid ethylene in it the absorption of heat from the atmosphere during the return journey of the tanker to the loading station is sufficient to cause a comparatively rapid rise of temperature and therefore of pressure because of the low heat capacity of the tanker and contents. However, when 1 cwt. or less is left in the container, the total amount of ethylene is not sufficient to cause an objectionable rise in pressure in a container of 500–1000 ft.³ capacity.

To eliminate the danger of sparks from static electricity, special conducting tyres are used, and during loading and unloading the chassis is connected to an earthed wire. The tank itself, the aluminium cladding and the chassis are electrically bonded together.

What I claim is:

1. A movable tank for transporting substantial quantities of liquid ethylene in bulk at temperatures below about —50° C. and pressures not in excess of 20 atmospheres comprising an inner stainless steel container for the liquid ethylene, said container having sufficient mechanical strength to withstand a temperature of —100° C. and internal pressures of up to 20 atmospheres and being from about ⅛ inch to ½ inch in thickness, means for venting said container to the atmosphere before the pressure reaches 15 atmospheres, thermal insulation surrounding said container which does not absorb water vapor from the atmosphere, being from about 2 inches to 8 inches in thickness and being sufficiently strong to support the inner container, thinner insulation material being used with the thicker steel, the resistance to heat transfer of said insulation being sufficient to prevent pressure within said tank from exceeding venting pressures during transit time up to 10 days, and a light weight water-impermeable covering of low heat absorbability completely surrounding said insulation and being completely separated from said inner container by said insulation, whereby the total weight of the tank, chassis and contents is not more than twice the weight of ethylene which can be carried.

2. The tank of claim 1, wherein the thickness of the steel is from about ¼ inch to ½ inch.

3. The tank of claim 1, wherein the steel is an austenitic stainless steel of from ⅜ inch to ½ inch thickness, the insulation is made of expanded rubber of from 4 inches to 6 inches thickness and the lightweight covering is made of an aluminum alloy.

4. The tank of claim 3, wherein the container comprises rolled metal sheets welded together with spun-dished end plates.

5. The tank of claim 4, wherein the container has baffle plates therein and extending transversely thereof to prevent surging of liquid ethylene on movement of said tank.

References Cited in the file of this patent

UNITED STATES PATENTS

| Number | Name | Date |
|---|---|---|
| 1,638,434 | Curme | Aug. 9, 1927 |
| 1,835,699 | Edmonds | Dec. 8, 1931 |
| 2,186,924 | Hooper et al. | Jan. 9, 1940 |
| 2,290,038 | Folmsbee | July 14, 1942 |
| 2,520,883 | Kornemann | Aug. 29, 1950 |
| 2,551,435 | Grogan | May 1, 1951 |